United States Patent
Erman et al.

(10) Patent No.: US 11,996,989 B2
(45) Date of Patent: May 28, 2024

(54) METHOD, AN APPARATUS AND A COMPUTER PROGRAM PRODUCT FOR NETWORK-AS-A-SERVICE MODEL

(71) Applicant: Nokia Solutions and Networks Oy, Espoo (FI)

(72) Inventors: Bilgehan Erman, Weehawken, NJ (US); Ejder Bastug, Paris (FR); Bruce Cilli, Atlantic Highlands, NJ (US); Andrea Francini, Pittsboro, NC (US); Raymond Miller, Lakeville, ME (US); Charles Payette, Rehoboth Beach, DE (US); Sameerkumar Sharma, Holmdel, NJ (US)

(73) Assignee: NOKIA SOLUTIONS AND NETWORKS, Espoo (FI)

( * ) Notice: Subject to any disclaimer, the term of this patent is extended or adjusted under 35 U.S.C. 154(b) by 0 days.

(21) Appl. No.: 18/318,221

(22) Filed: May 16, 2023

(65) Prior Publication Data
US 2023/0396516 A1 Dec. 7, 2023

(30) Foreign Application Priority Data
Jun. 3, 2022 (FI) .................................... 20225487

(51) Int. Cl.
H04L 41/5003 (2022.01)
H04L 67/10 (2022.01)
H04L 67/131 (2022.01)

(52) U.S. Cl.
CPC .......... H04L 41/5003 (2013.01); H04L 67/10 (2013.01); H04L 67/131 (2022.05)

(58) Field of Classification Search
CPC .... H04L 41/5003; H04L 67/10; H04L 67/131
See application file for complete search history.

(56) References Cited

U.S. PATENT DOCUMENTS 10,594,837 B1 * 3/2020 Dimascio ............ G10L 15/1822
10,868,732 B2 * 12/2020 Mishra ..................... H04L 41/40
(Continued)

OTHER PUBLICATIONS

ETSI. "ETSI TR 126 925 V16.0.0 (Nov. 2020): 5G; Typical traffic characteristics of media services on 3GPP networks (3GPP TR 26.925 version 16.0.0 Release 16)", 35 pages. (Year: 2020).*
(Continued)

*Primary Examiner* — George C Neurauter, Jr.
(74) *Attorney, Agent, or Firm* — Harness, Dickey & Pierce, P.L.C.

(57) ABSTRACT

An application specific interface (AA-NAPI) associated with an application for the purpose of controlling the networking aspects of the application session is provided by communication service provider (CSP). Cost model of network service types associated with a specific application type is learned by using the AA-NAPI. For each service-point joining the session, network properties are queried by using the AA-NAPI. During continuous service quality monitoring, upon detection of quality degradation leading to the decision to upgrade session quality, network service-type associated with a specific server-point is changed by using the AA-NAPI. Network specific actions are taken to reconfigure the network so that the requested service type is received by the specific service-point. New network capability is activated to improve network service level by using the AA-NAPI. Network specific actions are taken by the network to install new network capabilities so that the specific service-point's service quality is improved as requested.

15 Claims, 11 Drawing Sheets

(56) References Cited

U.S. PATENT DOCUMENTS

| | | | | |
|---|---|---|---|---|
| 10,938,736 | B2* | 3/2021 | Guo | H04L 67/101 |
| 11,665,106 | B2* | 5/2023 | Tariq | H04L 41/0897 |
| | | | | 709/226 |
| 11,722,429 | B1* | 8/2023 | Novlan | H04L 47/781 |
| 2007/0136372 | A1 | 6/2007 | Proctor et al. | |
| 2020/0244765 | A1 | 7/2020 | Uppili | |
| 2021/0149732 | A1* | 5/2021 | Barbara | G06F 9/5016 |
| 2023/0094384 | A1* | 3/2023 | Tikhostoup | G06F 9/505 |
| | | | | 718/104 |

OTHER PUBLICATIONS

"Zero-touch network and Service Management (ZSM); Cross-domain E2E service lifecycle management", ETSI GS ZSM 008, 2021, pp. 1-79.

"Service Ordering Management API User Guide", TM Forum Specification, TMF641, Version 4.1.0, 2020, pp. 1-66.

"Resource Inventory Management API User Guide", TM Forum Specification, TMF639, Version 4.0.0, May 28, 2020, pp. 1-33.

Ali-Eldin et al., "The Hidden Cost of the Edge: A Performance Comparison of Edge and Cloud Latencies", arXiv, Apr. 29, 2021, pp. 1-15.

"Automating Network as a Service, Using Operational Domain Management (ODM), TM Forum Open APIs and MEF LSO", M Forum Digital Transformation World, 2018 Catalyst Program, Webpage available at: https://s16705.pcdn.co/wp-content/uploads/2017/02/T.-Automating-Network-as-a-Service.pdf.

"Twilio Video", Twilio, Jan. 18, 2022, Webpage archive available at: http://web.archive.org/web/20220118132014/https://www.twilio.com/docs/video.

"Open API Table", TM Forum Ecosystem API Portal, Retrieved on May 25, 2023, Webpage available at : https://projects.tmforum.org/wiki/display/API/Open+API+Table_ga=2.131673615.1201408810.1635445609-140416023.1635445609.

"3rd Generation Partnership Project; Technical Specification Group Services and System Aspects; IP Multimedia Subsystem (IMS); Multimedia Telephony; Media handling and interaction (Release 17)", 3GPP TS 26.114, V17.2.0, Sep. 2021, pp. 1-471.

"3rd Generation Partnership Project; Technical Specification Group Services and System Aspects; Telepresence using the IP Multimedia Subsystem (IMS); Media Handling and Interaction (Release 16)", 3GPP TS 26.223, V16.4.0, Jun. 2021, pp. 1-41.

"Information technology—Coded representation of immersive media—Part 8: Network Based Media Processing", ISO 23090-8:2018E, 2018, 100 pages.

Anil Rao, case study "Telefónica Germany is partnering with Blue Planet to execute its iFUSION transport SDN strategy", Dec. 2020.

"Orchestration Center", Nokia, May 26, 2022, archived webpage available at: http://web.archive.org/web/20220526174828/https://www.nokia.com/networks/bss-oss/nokia-orchestration-center/.

"3rd Generation Partnership Project; Technical Specification Group Services and System Aspects; Functional architecture and information flows to support Common API Framework for 3GPP Northbound APIs; Stage 2 (Release 17)", 3GPP TS 23.222, V17.5.0, Jun. 2021, pp. 1-118.

"3rd Generation Partnership Project; Technical Specification Group Services and System Aspects; Service Enabler Architecture Layer for Verticals (SEAL); Functional architecture and information flows; (Release 17)", 3GPP TS 23.434, V17.3.0, Sep. 2021, pp. 1-181.

"SFU (Selective Forwarding Unit)", TrueConf, Oct. 23, 2021, archived webpage available at: http://web.archive.org/web/20211023132927/https://trueconf.com/blog/wiki/sfu.

"A short introduction to the architecture of a video call", daily, Sep. 25, 2021, archived webpage available at: http://web.archive.org/web/20210925173729/https://docs.daily.co/guides/intro-to-video-arch.

"3rd Generation Partnership Project; Technical Specification Group Services and System Aspects; System architecture for the 5G System (5GS); Stage 2 (Release 17)", 3GPP TS 23.501, V17.2.0, Sep. 2021, pp. 1-542.

Sutton et al., "Reinforcement Learning: An Introduction", The MIT Press, 2018, 518 pages.

Perveen et al., "Dynamically Reconfigurable Slice Allocation and Admission Control within 5G Wireless Networks", IEEE 89th Vehicular Technology Conference (VTC2019-Spring), Apr. 28-May 1, 2019, 7 pages.

Huang et al., "A Dynamic Network Bandwidth Allocation Mechanism under Network QoS Constraints", IEEE International Conference on Smart City/SocialCom/SustainCom (SmartCity), Dec. 19-21, 2015, pp. 963-968.

Li et al., "Latency-Optimal Virtual Network Functions Resource Allocation for 5G Backhaul Transport Network Slicing", Applied Sciences, vol. 9, No. 4, 2019, pp. 1-21.

Mason et al., "Using Distributed Reinforcement Learning for Resource Orchestration in a Network Slicing Scenario", IEEE Transaction on Networking, May 17, 2021, pp. 1-14.

"5G; Extended Reality (XR) in 5G (3GPP TR 26.928 version 16.0.0 Release 16)", ETSI TR 126 928, V16.0.0, Nov. 2020, 13 pages.

"Principles for a telecommunications management network", Series M: TMN and Network Maintenance: International Transmission Systems, Telephone Circuits, Telegraphy, Facsimile and Leased Circuits, Telecommunications management network, ITU-T Recommendation M.3010, Feb. 2000, 44 pages.

"3rd Generation Partnership Project; Technical Specification Group Services and System Aspects; Management and orchestration; 5G Network Resource Model (NRM); Stage 2 and stage 3 (Release 17)", 3GPP TS 28.541, V17.4.0, Sep. 2021, 472 pages.

"GB922 Information Framework (SID) R15.5.1", tmforum, May 20, 2016, archived webpage available at: http://web.archive.org/web/20160530204701/https://www.tmforum.org/resources/suite/gb922-information-framework-sid-r15-5-1/.

Hu et al., "Cellular-Connected Wireless Virtual Reality: Requirements, Challenges, and Solutions", IEEE Communications Magazine, vol. 58, No. 5, May 2020, pp. 105-111.

"Enabling Metaverse-ready networks: A Telecom Infra Project Birds of a Feather", Youtube, Mar. 2, 2022, Webpage available at : https://www.youtube.com/watch?v=pet1WFjjm9o.

Office action received for corresponding Finnish Patent Application No. 20225487, dated Jan. 3, 2023, 6 pages.

"5G; Extended Reality (XR) in 5G (3GPP TR 26.928 version 17.0.0 Release 17)", ETSI TR 126 928, 17.0.0, May 2022, 133 pages.

Petrov et al., "Extended Reality (XR) over 5G and 5G-Advanced NewRadio: Standardization, Applications, and Trends", arXiv, Mar. 4, 2022, pp. 1-7.

"Resource Catalog Management API User Guide", TM Forum Specification, TMF634, Version 4.1.0, Oct. 12, 2020, pp. 1-150.

"Zero-touch network and Service Management (ZSM), Closed-Loop Automation; Part 1: Enablers", ETSI GS ZSM 009-1 V1.1.1, Jun. 2021, pp. 1-40.

Intel, Nokia Corporation, "ITT4RT Permanent Document—Requirements, Working Assumptions and Potential Solutions", V0.6.2, Apr. 6, 2020. pp. 1-42.

Zero-touch network and Service Management (ZSM), End-to-end management and orchestration of network slicing, ETSI GS ZSM 003 V1.1.1, Jun. 2021, pp. 1-87.

Ciavaglia, Laurent, "ETSI ZSM 009 3 Closed Loop Automation Advanced Topics", Sep. 17, 2020, pp. 1-11.

Rauschenbach, Uwe, "The ETSI ZSM Framework Reference Architecture", Sep. 17, 2020, pp. 1-12.

"Zero-touch network and Service Management (ZSM); Requirements based on documented scenarios", ETSI GS ZSM 001 V1.1.1, Oct. 2019, pp. 1-89.

"Zero-touch network and Service Management (ZSM); Reference Architecture", ETSI GS ZSM 002 V1.1.1, Aug. 2019, pp. 1-80.

"Zero-touch network and Service Management (ZSM); Terminology for concepts in ZSM", ETSI GS ZSM 007 V1.1.1, Aug. 2019, pp. 1-11.

"5G; Extended Reality (XR) in 5G (3GPP TR 26.928 version 16.1.0 Release 16)", ETSI TR 126 928 V16.1.0, Jan. 2021, pp. 1-133.

(56) References Cited

OTHER PUBLICATIONS

"Zero-Touch Network and Service Management (ZSM); Closed-loop automation; Solutions", ETSI GS ZSM-009-2 V0.7.0, Oct. 2021, pp. 1-36.

"Zero-Touch Network and Service Management (ZSM); Closed-loop automation; Advanced topics", ETSI GR ZSM-009-3 V0.1.0, Oct. 2020, pp. 1-16.

Extended European Search Report received for corresponding European Patent Application No. 23175092.8, dated Sep. 29, 2023, 9 pages.

"OP Requirements and Architecture", GSM Association, Version OPG.02, 2021, pp. 1-120.

"Multi-access Edge Computing (MEC); Edge Platform Application Enablement", Draft ETSI GS MEC 011, V3.0.6, Mar. 2022, pp. 1-96.

Finnish Notice of Allowance dated Mar. 21, 2024 issued in Finnish U.S. Appl. No. 20/225,487.

\* cited by examiner

METHOD, AN APPARATUS AND A COMPUTER PROGRAM PRODUCT FOR NETWORK-AS-A-SERVICE MODEL

TECHNICAL FIELD

The present solution generally relates to network-as-a-service (NaaS).

BACKGROUND

The future networked applications, such as holographic collaboration will have more dynamic and intricate needs from the network. The current application-network interaction paradigms such as network slicing will not serve the needed purpose. This invention describes the methods and apparatus that will allow applications to control and use the network in a more optimal way but without being exposed to the associated complexities of doing so. This is achieved by the network providing the methods and the apparatus that maps application object references to network object references—these object references relate to service-points, network types, service types, and requests.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

Various aspects include a method, an apparatus and a computer readable medium comprising a computer program stored therein, which are characterized by what is stated in the independent claims. Various embodiments are disclosed in the dependent claims.

According to a first aspect, there is provided an apparatus comprising means for starting an application session in response to a request from a service-point or an application controller; means for providing an application specific interface (AA-NAPI) by communication service provider (CSPs), the application specific interface being associated with an application for the purpose of controlling the networking aspects of the application session; means for learning a current cost model of network service types associated with a specific application type by using the application specific interface; for each service-point joining the session, the apparatus comprises
  means for querying the network properties associated with the service-point by using the application specific interface;
  during continuous service quality monitoring, upon detection of session quality degradation leading to the decision to upgrade session quality, the apparatus comprises
   means for changing network service-type associated with a specific server-point by the application by using the application specific interface;
   upon application's request, means for taking series of network specific actions by the network to reconfigure the network so that the requested service type is received by the specific service-point;
   means for activating new network capability by the application to improve network service level associated with a specific server-point by using the application specific interface;
   upon application's request, means for taking series of network specific actions by the network to install new network capabilities so that the specific service-point's service quality is improved as requested.

According to a second aspect, there is provided a method, comprising: starting an application session in response to a request from a service-point or an application controller; providing an application specific interface (AA-NAPI) by communication service provider (CSPs), the application specific interface being associated with an application for the purpose of controlling the networking aspects of the application session; learning a current cost model of network service types associated with a specific application type by using the application specific interface; for each service-point joining the session, the method comprises
  querying the network properties associated with the service-point by using the application specific interface;
  during continuous service quality monitoring, upon detection of session quality degradation leading to the decision to upgrade session quality the method comprises
   changing by the application network service-type associated with a specific server-point by using the application specific interface;
   upon application's request, taking series of network specific actions by the network to reconfigure the network so that the requested service type is received by the specific service-point;
   activating by the application new network capability to improve network service level associated with a specific server-point by using the application specific interface;
   upon application's request taking series of network specific actions by the network to install new network capabilities so that the specific service-point's service quality is improved as requested.

According to a third aspect, there is provided an apparatus comprising at least one processor, memory including computer program code, the memory and the computer program code configured to, with the at least one processor, cause the apparatus to perform at least the following: start an application session in response to a request from a service-point or an application controller; provide an application specific interface (AA-NAPI) by communication service provider (CSPs), the application specific interface being associated with an application for the purpose of controlling the networking aspects of the application session; learn a current cost model of network service types associated with a specific application type by using the application specific interface; for each service-point joining the session, the apparatus is caused to
  query the network properties associated with the service-point by using the application specific interface;
  during continuous service quality monitoring, upon detection of session quality degradation leading to the decision to upgrade session quality the apparatus is caused
   to change by the application network service-type associated with a specific server-point by using the application specific interface;
   upon application's request, to take series of network specific actions by the network to reconfigure the network so that the requested service type is received by the specific service-point;
   to activate by the application new network capability to improve network service level associated with a specific server-point by using the application specific interface;

upon application's request to take series of network specific actions by the network to install new network capabilities so that the specific service-point's service quality is improved as requested.

According to a fourth aspect, there is provided computer program product comprising computer program code configured to, when executed on at least one processor, cause an apparatus or a system to: start an application session in response to a request from a service-point or an application controller; provide an application specific interface (AA-NAPI) by communication service provider (CSPs), the application specific interface being associated with an application for the purpose of controlling the networking aspects of the application session; learn a current cost model of network service types associated with a specific application type by using the application specific interface; for each service-point joining the session, the apparatus is caused to query the network properties associated with the service-point by using the application specific interface;

during continuous service quality monitoring, upon detection of session quality degradation leading to the decision to upgrade session quality the apparatus is caused to change by the application network service-type associated with a specific server-point by using the application specific interface;

upon application's request, to take series of network specific actions by the network to reconfigure the network so that the requested service type is received by the specific service-point;

to activate by the application new network capability to improve network service level associated with a specific server-point by using the application specific interface;

upon application's request to take series of network specific actions by the network to install new network capabilities so that the specific service-point's service quality is improved as requested.

According to an embodiment, during continuous service quality monitoring, upon detection of potentially unnecessary network service capabilities, and the subsequent decision to lower network service cost, network service-type associated with a specific server-point is changed by the application by using the application specific interface;

upon application's request, series of network specific actions are taken by the network to reconfigure the network so that the requested service type that will lower the incurring service cost is received by the specific service-point;

a network capability is deactivated to lower network service cost associated with a specific server-point by the application by using the application specific interface;

upon application's request, series of network specific actions are taken by the network to uninstall network capabilities so that the incurring dynamic cost to the application is reduced.

According to an embodiment, an edge function is added as the new network capability to improve network service level associated with the specific server-point.

According to an embodiment, a network function is inserted to an edge cloud associated with the service point as a network capability.

According to an embodiment, an edge function is removed when deactivating a network capability.

According to an embodiment, a network function at an edge cloud associated with the service point is removed when uninstalling network capabilities.

According to an embodiment, the application is an eXtended Reality Conversation (XRC) application.

According to an embodiment, the computer program product is embodied on a non-transitory computer readable medium.

DESCRIPTION OF THE DRAWINGS

In the following, various embodiments will be described in more detail with reference to the appended drawings, in which.

DESCRIPTION OF EXAMPLE EMBODIMENTS

Figure 1:
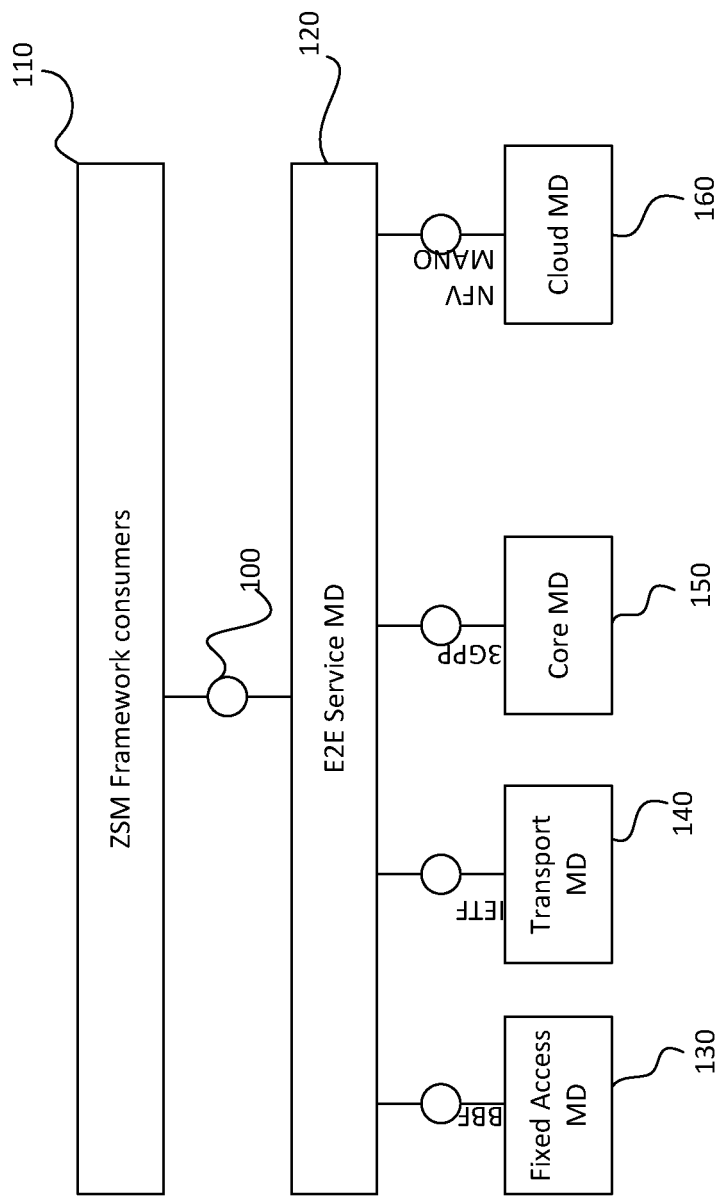
FIG. 1 shows an example of a functional gap that exists in network service control specifications between network services and networked applications.

The following description and drawings are illustrative and are not to be construed as unnecessarily limiting. The specific details are provided for a thorough understanding of the disclosure. However, in certain instances, well-known or conventional details are not described in order to avoid obscuring the description. References to one or an embodiment in the present disclosure can be, but not necessarily are, reference to the same embodiment and such references mean at least one of the embodiments.

Reference in this specification to "one embodiment" or "an embodiment" means that a particular feature, structure, or characteristic described in connection with the embodiment in included in at least one embodiment of the disclosure.

Network-as-a-service (NaaS) is a service model, where customers are able to rent network services from network providers. NaaS models are currently available as cloud services, but new network capabilities enable new opportunities for network service providers to provide NaaS services. The aim of the present embodiments is to introduce an improved approach for the Network-as-a-Service (NaaS) paradigm. The present embodiments relate to a concept about semantic modelling of interfaces for open, programmable network services.

Some of the semantic aspects that the present solution brings together are listed below:
- an application-specific model for different interface definitions—simplifying the information model by containing only the necessary and specific set of entities;
- the capability for the application to control service components via application object references as endpoints—for example a request to improve the service quality level of an endpoint's access network, which the network controller would be able to translate into network-specific actions by knowing the application specific aspects;
- depending on the characteristics of the application (for example XR-applications as discussed in this disclosure), having application-specific semantic entities in the interface for the application to change service function chains and their connectivity. For example, the application would only indicate the need for a network function associated with a cluster of endpoints; knowing the application type, the network controller would be able to take network-specific actions and reconfigure connectivity.

The scope of the present embodiments is a model of operation of network-intensive immersive applications (e.g., eXtended Reality (XR) applications), where the application provider closely controls the network service it receives from the communication service provider.

The present embodiments address the specification of Network-as-a-Service (NaaS) Application Programming Interfaces (APIs), providing models and methods to effortlessly control network connectivity for the application components through a high-level service orchestration API that is easy to adapt by application developers.

The field of the present solution relates to the following standards and products:
- Network service orchestration frameworks such as ETSI ZSM008—End-to-end cross-domain service orchestration and automation
- TM Forum's Service Ordering Management API, TMF641.

The present embodiments are targeted at applications that may demand Quality-of-Service (QoS) levels that conventional best-effort services cannot support consistently. EXtended Reality (XR) applications represent one of the examples. XR applications include virtual reality (VR), augmented reality (AR), and mixed reality (MR). 360-degree video and holographic communications may also be considered to be part of the XR family in this disclosure.

Existing implementations of XR applications for consumers still rely on the co-location of end-user devices and compute platforms because ordinary network services cannot support their geographical separation. Enabling such separation will create tremendous market opportunities for both application and network providers but remains a challenging task because of the extreme demands of the applications on network performance (throughput ranging between 100 Mb/s and 10 Gb/s, one-way packet latency between 5 and 10 ms).

The QoS level required by XR applications may involve an additional cost for the service user. To minimize the overall cost of operation of the application, elevation to a premium service should only occur when the basic best-effort service fails to deliver the necessary QoS. Run-time control of the network service by the application allows the activation of premium service features only when needed.

The operation of networked applications involves two distinct domains: the application domain and the network domain (for example, Netflix and AT&T, respectively). Today, operation and control of these two domains are completely separate with almost no interaction between them for run-time control of application sessions. As networks transition to the NaaS model, methods are being defined for the interaction between the two domains.

Existing interfaces for control of network service capabilities only allow human interaction, through a vendor-defined graphical user interface. Instead, autonomous, run-time control of an open network requires the implementation of new application programming interfaces (APIs).

Service-level network APIs have indeed started appearing, in line with the end-to-end (E2E) network slicing model. With E2E network slicing, external entities (such as networked applications) only request a specific service type from the network. During the lifetime of the service instance, the network configures and enables the service, autonomously controls its capabilities, and finally terminates it.

Such rigid service delivery model is not suitable for XR applications, especially if delivered over-the-top (OTT) to consumers (it is a good fit, instead, for services that support mission-critical, managed applications likes smart factory, autonomous driving, and remote surgery). Ideally, OTT XR applications should be able to control individual features of the underlying network service at run time, based on the application-level performance data that they receive from their own components and that are not available to the network domain. This type of control would allow the applications to minimize their network service costs using their own cognitive, autonomous control techniques.

Security, business intelligence, and privacy reasons make it challenging for network operators to open their network assets to this type of programmable control. The present embodiments address this challenge.

The present embodiments improve the related technology by the semantic modelling of the network service API and the definition of attributes that should be included and excluded, of required functional units and their placement, and of the procedural steps of the control scenarios—taken by the network driven by the actions taken by the application, performing the mapping in between.

ETSI document TR 126 928, V16, 2020-11, titled "5G; Extended Reality (XR) in 5G" is relevant to the present embodiments as it covers the characteristics and network requirements of XR applications. The following concepts also relate to the present embodiments:
- Edge cloud (throughout the present disclosure, there is no distinction between edge and far-edge clouds);
- Network functions;
- Closed-loop network control;
- Microservices;
- Cognitive application controllers that can take advantage of machine-learning techniques.

As discussed above, the throughput and latency requirements of XR applications may not always be satisfied by the network services that communication service providers typically offer to consumers (such as the best-effort access service that consumers receive with monthly contracts). The operational cost is the primary reason for the lack of performance in best-effort services. Premium connectivity services that deliver better throughput and latency performance consume more network resources and therefore incur higher operational costs. Since the end user may require the enhanced performance of the premium service only occasionally, the static allocation of additional resources for such a service can easily translate into a waste of expense for the consumer and waste of resources and revenue opportunities for the service provider.

As an analogy to demonstrate this cost dynamic, consider the scenario of a person that can choose two transportation options for going from point A to point B: a) taking a public bus; or b) reserving a private car ride. With the first option, the transportation time is expected to be between 20 and 40 minutes depending on the arrival time of the bus at point A and on the level of traffic congestion along the pre-set path between A and B. There is no cost variability if the person holds a monthly subscription. With option b), the transportation time is expected to be between 10 and 12 minutes if taking the fastest path at the current traffic conditions. The cost is fixed at 15 USD per ride.

Similarly, an edge cloud deployment of network functions for support of XR applications incurs higher costs than a central cloud deployment because edge clouds have much tighter constraints in terms of resource capacity. Networked application providers (NAPs) can minimize their costs by ensuring that network functions are deployed in edge-cloud facilities only when and where they are really needed. As an example, a scenario can be envisioned with two groups of end users located in two different countries participating in a session with holographic imaging. Besides the endpoint components of the application (such as a camera or a headset), network functions serving multiple endpoints can optionally be deployed at edge-cloud facilities to process the data streams from their local users (e.g., in one country) so that the throughput requirements on the access connections of the remote users (in the other country) are relaxed. Examples of such edge-cloud processing include data stream transcoding, merging and bundling, the aggregation of control messages, and the prioritization of management, control, and status messages. NAPs will want to optimize the combination of network function and network resource deployments by adaptation to the endpoint placement and to the requirements of the individual endpoints.

Given the performance needs and the cost dynamics, NAPs must establish service engagements with communication service providers (CSPs) when special network capabilities are required for the delivery of the networked applications. There are many options for CSPs to address the service needs of the NAPs. The present invention covers the case where the CSP allows the NAP to control the network service through a Network-as-a-Service (NaaS) arrangement. While the NaaS concept enables simpler and more flexible application deployments, a variety of complex problems remains to be solved for its realization.

Frameworks such as ETSI Zero-touch Service Management (ZSM) and TM Forum Open APIs have recently started including the definition of common interfaces towards the realization of end-to-end network service setup and management. Highly detailed and complex interfaces defined by ETSI ZSM are geared towards addressing requirements on the operational coupling between CSPs (at various service layers) and network service providers (NSP), or between large enterprises operating their own private networks and CSPs. However, there are no known definitions geared towards a concise but powerful network control mechanism for NAP developers to use. In this context, "concise" means simple and lean, with just the right scope that an application developer needs and understands (not complex like the existing interfaces with full spectrum of semantic definitions aimed at functional commonality), and "powerful" means that the mechanism allows the application owner to control domain-specific sub-segments of the network in real time, while dynamically optimizing the operational cost of the application session.

Unlike industrial automation applications, many XR applications present scenarios where all the parties in a session cannot join a pre-set network slice (for example, a slice that is configured to support URLLC services for ultra-low-latency applications), as is the case when the session participants reside in different CSP networks (network slices are virtual partitions of a physical network that support the differentiation of performance metrics and functional capabilities for diverse service).

Network slicing is the basis for the ongoing specification of end-to-end network service management capabilities by vendors and standard bodies. However, when the top-level service orchestration is tied rigidly and exclusively to end-to-end network slicing, the application controllers (e.g., for a Zoom conference session) have no direct visibility over the network segments that support the application sessions and therefore cannot optimize their operational costs. For example, it may be desirable for an application controller to be able to request enhanced QoS capabilities (possibly by selection of a network slice that can enforce them) only over network segments where congestion in the best-effort service is degrading the end-user quality of experience (QoE), while keeping the choice of best-effort service over the other segments as long as they remain uncongested. Accurate knowledge of the application performance, expressed in QoE terms, can only be maintained by the application controller. The network service controller can collect quality-of-service (QoS) measurements, but their translation into QoE metrics is never trivial, and also unlikely to be shared by the network service providers with the application providers.

FIG. 1 illustrates a northbound interface (NBI) 110 with an element 100 that highlights the functional gap that exists in network service control specifications between network services and networked applications. As shown in FIG. 1, the NBIs 110 are aimed at configuring service orders for subsequent autonomous control of the network by the network domain itself.

The E2E service Management Domain (MD) 120 provides E2E network slicing related management services, but also consumes management services provided by a Fixed Access MD 130, a Transport MD 140, a Core MD 150 and a Cloud MD 160. This approach does not enable run-time control of the network services by intelligent applications.

There have been considerations how to define the NBIs of the E2E service MD. One possibility is to use a TMF (TeleManagement Forum) interface. A generic TMF is intended for inter-service-provider coupling and operations. Other frameworks to define the element 100 are also considered, for example a Twilio API for video applications.

However, the TMF REST API cannot be used to issue real-time commands to perform a fine-grained control of the network. Currently, the TMF interface is part of a set of REST APIs for lifecycle management of network services: it is a non-standalone API that depends on other APIs to build up the context of the resource object references.

The Lifecycle Service Orchestration (LSO) defines a list of interfaces as a full-blown framework for lifecycle management. The framework has a reference point for implementation of an Application-Aligned NaaS API (AA-NAPI). The role of the reference point is the following:

Customer controls service by requesting changes to dynamic parameters as permitted by service policies;
Customer queries operational state of the service;

Customer requests change to administrative state of a service or service component (e.g., Service Interface);

Customer requests update to defaulted service parameters which are allowed to be customized (policy-controlled).

This introduces a reference point between the customer and the SP domain for dynamic control purpose.

A noteworthy trend in network service operation is the evolution of autonomous closed-loop network control towards a lifecycle management approach where a service is configured, activated, checked for assurance, and terminated. This perspective is overlooking the alternative fact (and the associated opportunity) that an intelligent application outside the service-provider domain may want to control the network services during the application session run-time. For example, for a collaboration scenario with holographic image transmissions, if some participants are geographically close to one another while another participant is connected from another country, the application controller may elect to activate the enhanced QoS level only for one of the two sets of participants, while keeping the other at the best-effort level—all these decisions depend on the QoE reported from the endpoints (which is only available to the application), the endpoints' service level expectations (best-effort or premium), the dynamic cost of premium service charged by the network provider, and possibly other factors.

The teleconferencing and telepresence applications and their networked operation described in various standards documents (for example:

3GPP TS 26.114: IP Multimedia Subsystem (IMS); Multimedia telephony; Media handling and interaction, 3GPP TS 26.223: Telepresence using the IP Multimedia Subsystem (IMS); Media handling and interaction, 3GPP TSG-SA4 Meeting #108e Immersive Teleconferencing and Telepresence for Remote Terminals (ITT4RT) Permanent Document—Requirements, Working Assumptions and Potential Solutions, and 3GPP TS 26.223: "Telepresence using the IP Multimedia Subsystem (IMS); Media handling and interaction")

are related to applications that would be operated by CSPs or NSPs within the administrative domain of the network—typically as part of an IP Multimedia Subsystem (IMS) suite. These solutions do not address multi-administrative-domain interactions between the application domain and the network domain via a distinct interface. Instead, the present invention is about the operation of applications that are owned and operated by networked application providers (NAP). Edge clouds and multiple media resource controllers are also not addressed in the above documents.

A workflow model related to the transmission of media flows under the title network-based media processing (NBMP) is known from a document ISO/IEC 23090-8: "Part 8: Network-based media processing". The concept of "workflow" in the model relates primarily to the definition of function chains. The scope of NBMP does not include the interaction of multiple administrative domains that have their own models for resource representation. Instead, the document attempts to build an overall model that incorporates all the entities that will be involved in the delivery of media flows across the network. For this model to be applicable, all NAPs and all CSPs need to adopt the complete operational model defined in the document.

Vendor solutions for network service management provide dashboard-based management. This type of solution is designed for interaction with a human operator. It does not offer programable interfaces exposed as a service.

Providing a full-blown, application programming interface for network service control for generic operations will likely create many challenges and concerns for CSPs.

The document ETSI GSM ZSM 009 "End-to-end management and orchestration of network slicing" provides interface definitions for network resource management. The framework is modeled around network slices as the primary object types. On the other hand, a more desirable interface between the NAPs and CSPs would be based on intents involving a minimal set of objects (such as the nodes participating in the application's session). The operations requested by the NAP (as the intent gets translated) may relate to network slices or to many other entities that are not associated with a slice instance or type—for example, an edge function owned by the NAP may be activated and the CSP may just need to coordinate 5G UPF embedding. Therefore, a strictly slice-specific interface definition is not applicable to the scenarios addressed by the invention.

The 3GPP Common API Framework (CAPIF) is a framework definition that provides API processing functions for common northbound programming interfaces for the 3GPP mobile network domain. The framework describes the API invokers, the API exposure functions, authentication/authorization, event subscription, and other platform capabilities.

The 3GPP Service Enabler Architecture Layer for Verticals (SEAL) [TS 23.434 V17.3.0 2021-09] is a set of specifications to support vertical applications. SEAL is aimed at providing common capabilities that many verticals can make use of (such as location services.)

None of the solutions reviewed above includes the following features of the present invention:

a Network-as-a-Service-type API model for application-driven end-to-end network service control;

a notion of network-segment control request at the top service API level by implicit association with a given endpoint.

The present solution is motivated by the following observations:

The NaaS model will make networks better suited to the requirements of demanding, intelligent applications.

NAPs will own almost every facet of their networked applications.

The NaaS model will create new revenue opportunities for CSPs.

The present embodiments provide a method for the interaction of NAPs and CSPs within the context of a specific application type. The method according to an embodiment is captured under the abstract interface definition named Application-Aligned NaaS API (AA-NAPI). The AA-NAPI has specific definitions and instantiations for every application type. For example, the API for immersive XR Conferencing (XRC) applications is called XRC-NAPI.

Figure 2:
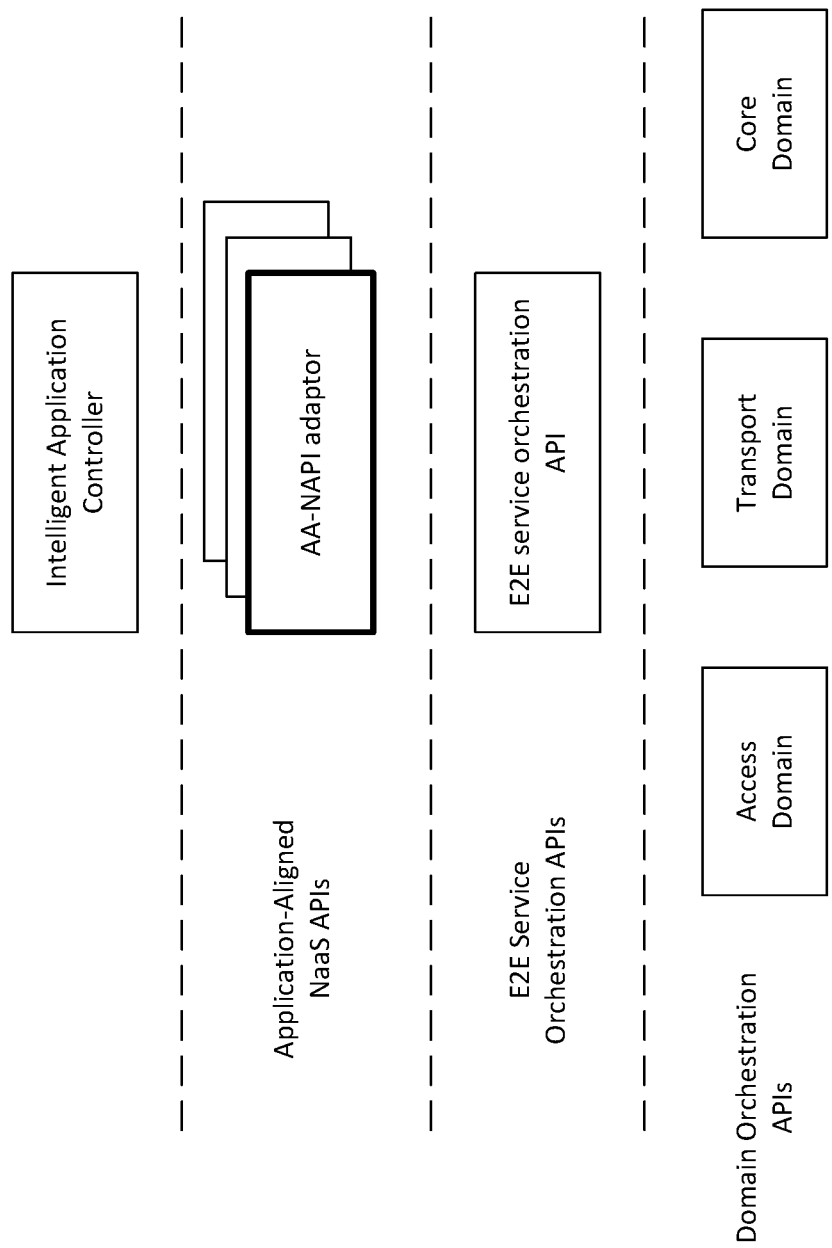
FIG. 2 shows an example of the architectural placement of the Application-Aligned NaaS APIs (AA-NAPIs) and of the AA-NAPI adaptor functions according to the present embodiments.

The present embodiments also provide an adaptor function that enables the coupling between the context of the API and the lower-level, end-to-end CSP service orchestration interfaces. These lower-level interfaces may be based on frameworks defined by ETSI, by TMF, by the network vendors, or by the CSP's. FIG. 2 illustrates the architectural placement of the AA-NAPIs and of the AA-NAPI adaptor function instances according to the present embodiments.

The present embodiments define an interface for the interaction of a networked application provider (NAP) with a communication service provider (CSP), and an adaptor function that maps the intents indicated over the interface onto the conventional lower-level service interfaces that are controlled by the CSP. This is illustrated in FIG. 2.

The present embodiments relate to the concept of an application-specific interface. For different applications, the interface takes different forms based on the object models of the applications. An XR Conferencing (XRC) application is used in this disclosure to describe the solution. An application and a network model are defined to help explaining the concept of the present embodiments.

The abstract form of the interface according of the present solution is called application-aligned NaaS API (AA-NAPI). The application-specific embodiment of the present solution is referred to as the XRC-NAPI. In this section, the terms AA-NAPI and XRC-NAPI may be used interchangeably because the latter is a particular instance of the former.

Figure 3:
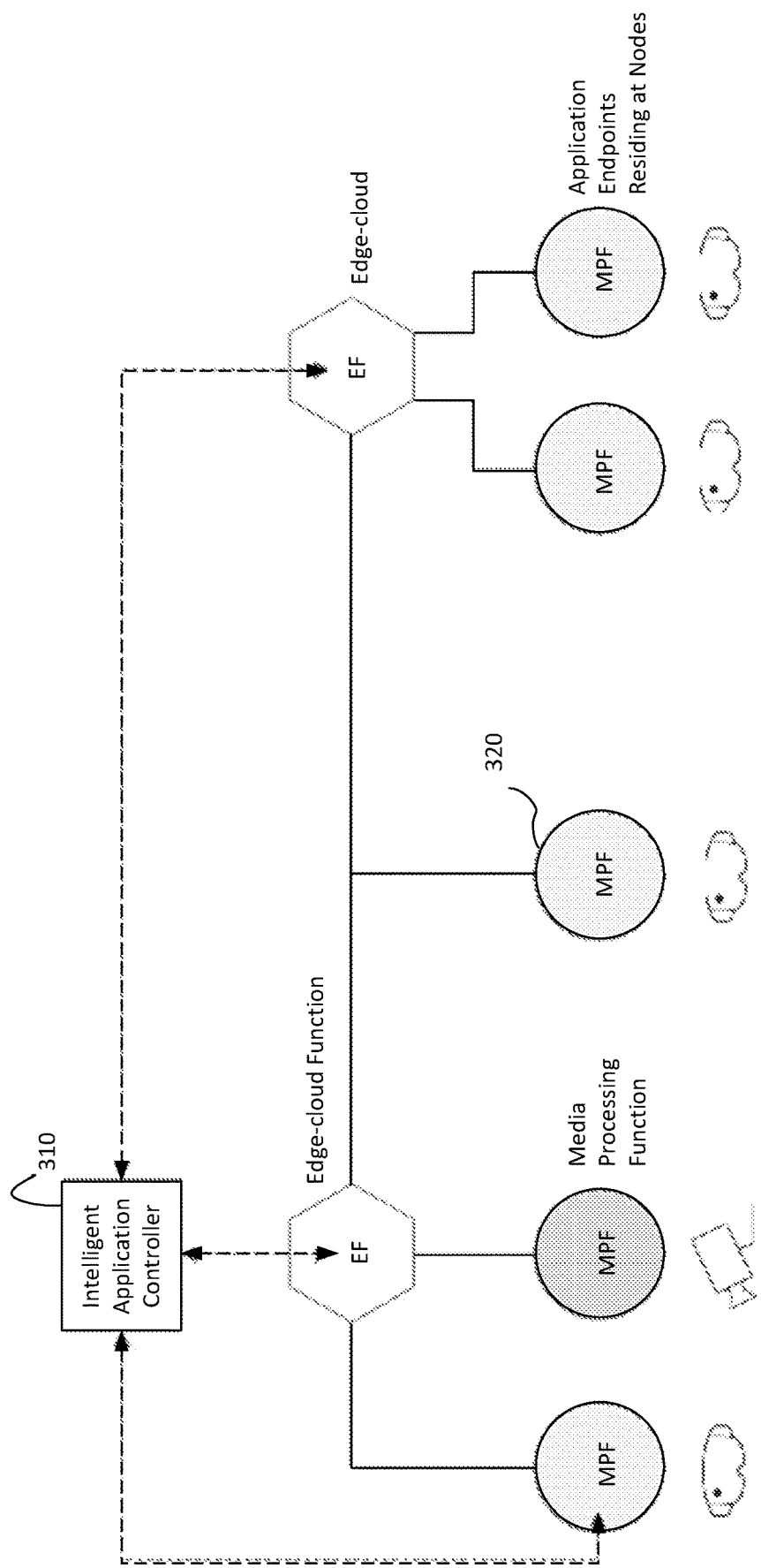
FIG. 3 shows an example of a distributed Extended Reality Conferencing (XRC) session modeled according to present embodiments.

The operation of a fictious XRC application is described first. FIG. 3 illustrates how a distributed XRC session is modeled according to an embodiment.

In the example of FIG. 3, the session of the application is managed by an intelligent application controller (IAC) 310. The session includes endpoints residing at network nodes, e.g., node 320. The transmitting endpoints include a media processing function that performs operations like stitching multi-camera views, encoding streams, and others. The receiving endpoints include functions such as rendering of the final image on XR devices. An application session also includes network functions such as a selective forwarding unit (SFU). In a multi-party collaborative application, each participant sends their streams to a central SFU function. The SFU function forwards each participant's streams to all the other participants. Network functions such as the SFU are capabilities that the IAC deploys as needed—for example, when there are more than four parties in a session.

Figure 4:
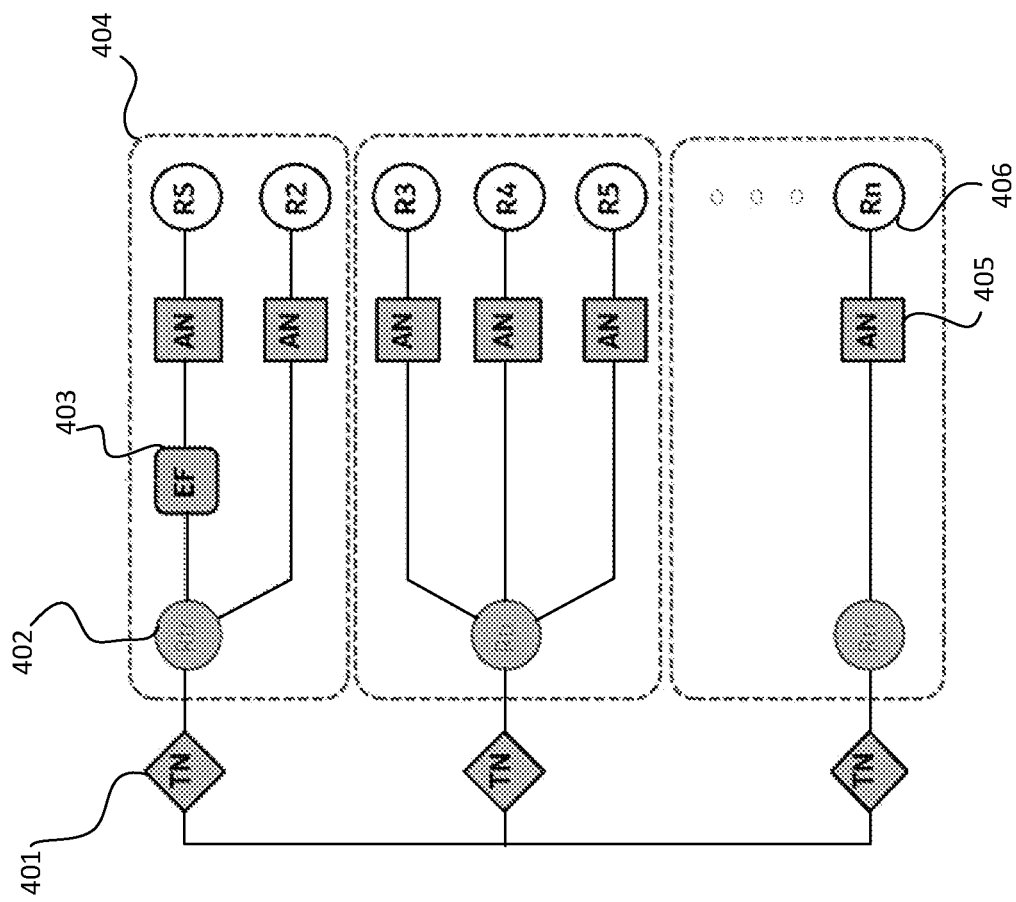
FIG. 4 shows an example of a model of the network as the Intelligent Application Controller (IAC) interprets it.

FIG. 4 shows a model of the network as the IAC interprets it in terms of its own operational needs. The network of the model may be owned and operated by one or more CSPs.

The NAP has a subscription contract with CSP-A, which provides the end-to-end service capability to the NAP. According to the NAP's view of the network, each node that participates in the application session is connected to an Access Network (AN) 405. The AN 405 offers two types of connectivity services: best-effort (BE) (i.e., the default service), and high quality (HQ) (i.e., a premium service). The HQ service provides low-latency and high-throughput guarantees.

The network includes edge-cloud facilities, henceforth referred to as edge clouds (ECs) 404 for simplicity. The IAC can activate an edge-cloud function (EF) 403 on ECs 404 that have geo-location affinity with specific endpoints. CSPs also include ECs that are close to or co-located with NAP ECs (this proximity is intentionally established for low-latency coupling between the NAP and the CSP).

The ANs 405 are interconnected with each other and with the ECs 404 through routers 402 and via transport networks (TNs) 401. TNs 401 also offer different service levels, just like the BE and HQ levels of the ANs 405.

The HQ service is more expensive than the BE service. When the IAC requests an HQ service in an AN 405 or in a TN 401, the higher cost is dynamically imposed on the NAP according to the NAP subscription contract with the CSP. It is not relevant for the present embodiments, but it should be noticed that there may be many different cost/subscription models involving different parties in various combinations. The cost of the TN HQ service is assumed to be higher than the cost of the AN HQ service. The cost of activating an EF 403 instance at an EC 404 is assumed to be higher than the cost of the TN HQ service.

The application endpoints reside in Receive nodes (R) and Receive/Send (RS) nodes 406. Every endpoint is attached to an AN 405. An endpoint can assume either the R or the RS node 406. In an application session, there is always only one RS node 406 at any given time. ANs 405 and EFs 403 are interconnected by TNs 401.

Figure 5:
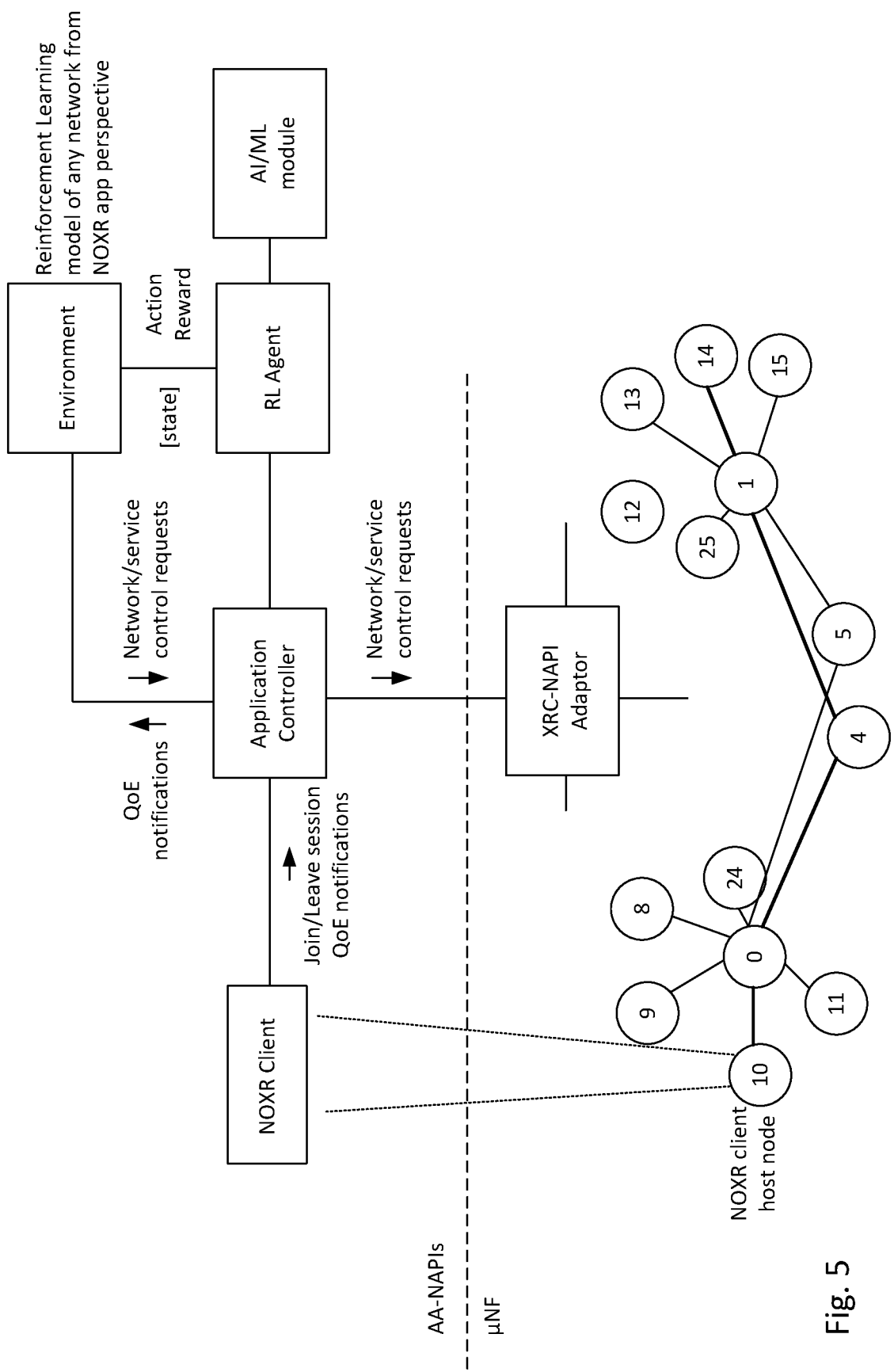
FIG. 5 shows an example of proof-of-concept implementation of the IAC.

FIG. 5 shows a proof-of-concept implementation of the IAC. The IAC of the figure uses the XRC-API to control the network service levels and functions that are deployed for the XRC session. The IAC determines its decision policy based on QoE reports that it receives from the endpoints and any other information about the environment that hosts the session. Note that the QoE reports are generated by application entities (e.g., the endpoints), and never received from the network service layer through the AA-NAPI.

Figure 6:
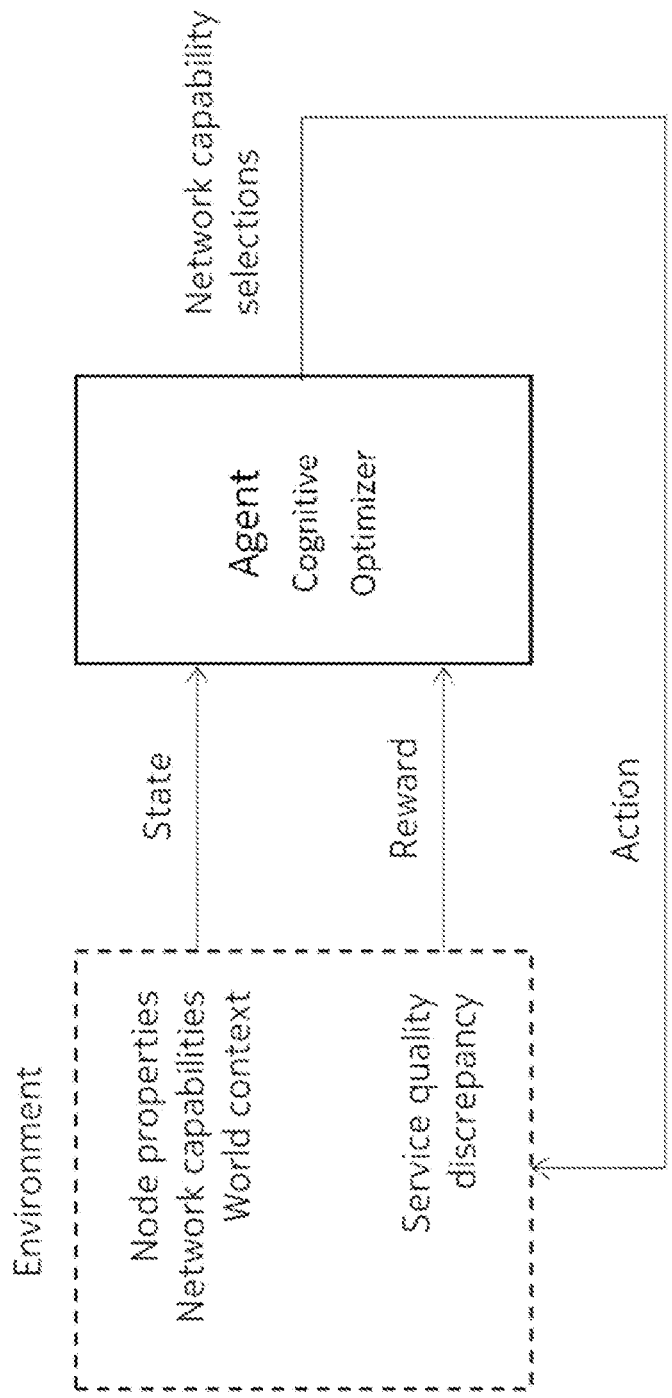
FIG. 6 shows an example of Reinforcement Learning models.

The IAC relies on its cognitive capabilities for controlling the network service variables that determine the quality of the ongoing XRC session. FIG. 6 illustrates that these cognitive capabilities result from Reinforcement Learning (RL) models. RL techniques allow the IAC to quickly refine the policies that drive the cost-optimal reconfiguration decisions.

Turning again to FIG. 2, the system according to present embodiments includes the Application-Aligned NaaS API with its abstract properties, and the AA-NAPI adaptor function.

The present embodiments are discussed in more detailed manner with reference, but not limited, to an XRC application. The following notation can be applied throughout the definition of the XRC-NAPI:

The colon punctuation mark (:) indicates the definition of an object with indented attributes listed in subsequent lines. The equal sign (=) indicates a value instance.

AA-NAPI:
    application-type="XRC"
    service-point:
        type="endpoint" or "edge-function"
        address
        geo-location
        connection-flow
    network:
        access-network
        transport-network
    service-type:
        default-quality
        application-quality
    request:
        inquire-endpoint-network
        inquire-dynamic-cost
        change-network-service-level
        activate-edge-function
        deactivate-edge-function The above definition describes the model by which the application interprets the environment in which it operates—in terms of its interaction with the network services offered by the CSP.

Service-Point:

Service points represent connected entities that participate in the application session. For the XRC application, there are two types of service-points: endpoint and edge-function. The connections between service points allow the participating entities to communicate.

The attributes of service-point are type, address (e.g., the IPv6 address), geo-location, and connection-flow. For the XRC application, endpoint and edge-function are the two possible values of the type attribute. The geo-location attribute is relevant to edge-cloud related bindings between NAPs and CSPs. NAPs and CSPs are discussed in more detailed manner later. The connection-flow attribute identifies specific connections that are of interest to the application in terms of the service levels. To the intelligent application controller (IAC), the service points report the connection-flows that they are currently using for the application session. The IAC does not need to interpret the semantics of the connection-flow identifier when making service-type decisions, as described later. It is to be noticed that a service point may have other active data flows that are not relevant to the application.

Service-Type:

The connection-flows of a service point may be of different service types. For the XRC application, the possible values of service-type are the default-quality and the application-quality. The default-quality service type is the type of service that a CSP provides without a cost premium to the NAP. It corresponds to the best-effort service that was mentioned earlier. For example, this would be a case where the endpoint (of the residential customer) pays the CSP for a monthly service subscription. The selection of the default-quality service type does not include additional, dynamic cost for the NAP during the session. The selection of the application-quality service type increases the quality of the CSP service so that the application is intended to operate without QoS degradation under any network condition. Dynamic activation of the application-quality service type induces additional cost to the NAP. The application-quality service corresponds to the "high-quality" or "premium" service type mentioned earlier.

For a given application, the CSP describes the KPI parameters that it provides for an application-quality service type. These parameters may be agreed by the industry or specified by standards (e.g., the 3GPP 5G 501 values). The IAC may split the end-to-end KPI requirements into per-domain components. It should be noticed that it benefits the application developer when CSP defines the service-level KPIs (based on industry-standard norms)—it relieves them from needing to learn the technical details.

In the context of this embodiment, the IAC receives service quality reports directly form the endpoints as a measure of QoE. The IAC examines the QoE values to determine if the application is receiving from the network the level of service quality that it needs for proper operation.

Edge-Function:

Applications have various types of service points. For the XRC application, edge-function is another type of service point besides endpoint. Edge functions are capabilities that the IAC can activate to improve the QoE for the endpoints of the session.

In the context of this embodiment, the IAC makes decisions on when to add edge functions to the session to improve the service quality of the endpoints. The operation of the edge functions may fully or partially belong to the NAP, or to the CSP. Even when the lifecycle management belongs entirely to the NAP, using the AA-NAPI, the NAP coordinates the activation of the edge function with the CSP so that the CSP can align its terminating functions (such as the 5G UPF) with the location of the edge function.

Network:

In the context of the AA-NAPI, network is a segment of the underlying physical infrastructure that is associated with a service point of the application. As needed, the IAC selects the service type for each segment. In the post-5G, pre-6G technology timeframe, the realization of the XRC-NAPI envisions two types of networks: access-network (AN) is for endpoint attachment, and transport-network (TN) is for connectivity between edge functions. These networks can represent independent domains, with respective communications technologies and network management systems. Examples include fixed access networks, mobile access networks, and optical transport networks. For inclusion of a TN, an XRC session might have at least two active edge functions or not have all the service-points in the same AN.

Requests:

Requests convey the actions that the NAP wants the CSP to perform. They are formulated as intents—only with enough details to express the NAP needs.

For example, the XRC application can request the following five types of actions:

a. Inquire-endpoint-network is the NAP's request to learn the properties of the network of attachment of a given endpoint. The purpose of this inquiry is to understand if the service type of the network of the endpoint can be controlled by the CSP. For example, the CSP that manages the AN of an endpoint may not be the same CSP that supports the AA-NAPI, so the NAP may not be able to control the AN service type for the endpoint.

b. The NAP issues the inquire-dynamic-cost command to learn the dynamic cost of different service types. In the case of XRC-NAPI, the cost refers to the application-quality service type offered by an AN, to the application-quality service type offered by a TN, and to the activation of an edge function at a given location.

c. The NAP uses the change-network-service-level command to set the service level for the network objects. For example, in the XRC-NAPI this command is used to set the application-quality service type for the connection flows of the application session within an AN or a TN.

d. When the NAP decides to activate an edge function, it issues the activate-edge-function command. There may be many different combinations of edge function configurations. For example, the lifecycle of the edge function may belong entirely to the NAP or the CSP. When it belongs to the NAP, this command instructs the CSP to configure its network so that the AN termination points align with the edge-function location to satisfy low-latency requirements (e.g., for migration of the 5G UPF to a location that is close to the edge function).

e. The deactivate-edge-function command instructs the CSP to reset the network configuration that was modified for prior activation of the edge function.

In the implementation of the AA-NAPI, each request listed above may include arguments that represent required values. For example, the inquire-endpoint-network request includes at least one argument to represent the target endpoint. The argument can be a data structure that has at least the network address field.

The AA-NAPI may also include objects, service types, requests, service points, and networks that are not explicitly described above.

AA-NAPI Adaptor:

The AA-NAPI adaptor and the adaptors for other application types are functional modules that convert AA-NAPI requests to the transactional representation of the lower level, i.e., the end-to-end (E2E) service orchestration APIs that are used by the CSP. The E2E service orchestration API may be a standards-compliant API, or it may be a custom API developed by the CSP itself or by a vendor. As described in the introduction sections, these APIs are now emerging, but there are no commercially available ones for end-to-end network programmability. Instead, there are dashboard-oriented implementations and implementations for single-CSP administrative domains, and there are also solutions that are not multi-domain (and therefore not end-to-end).

As described, FIG. 5 shows a proof-of-concept implementation of the AA-NAPI. In FIG. 5, an XRC-NAPI that includes an instance of an XRC-NAPI adaptor is used as an example. On the northbound side, the adaptor receives commands from the IAC. These commands operate on an object model like the one described earlier in this section. On the southbound side, the adaptor issues commands to the lower-level modules of the network fabric.

AA-NAP adaptor, such as XRC-NAPI adaptor. for example, is a software module, which can be implemented in the Python language. It may expose the XRC-NAPI as HTTP-based REST GET and POST commands. On the southbound side, it may also use REST GET and POST commands to communicate with the lower layers of the network fabric. For example, in response to the NBI request
  change-network-service-level to application-quality for node n0001 the adaptor may send a REST command to the node n0001:
  set-maximum-bandwidth to 100 Mbps
  (while the default-quality bandwidth was 10 Mbps).

Figure 7:
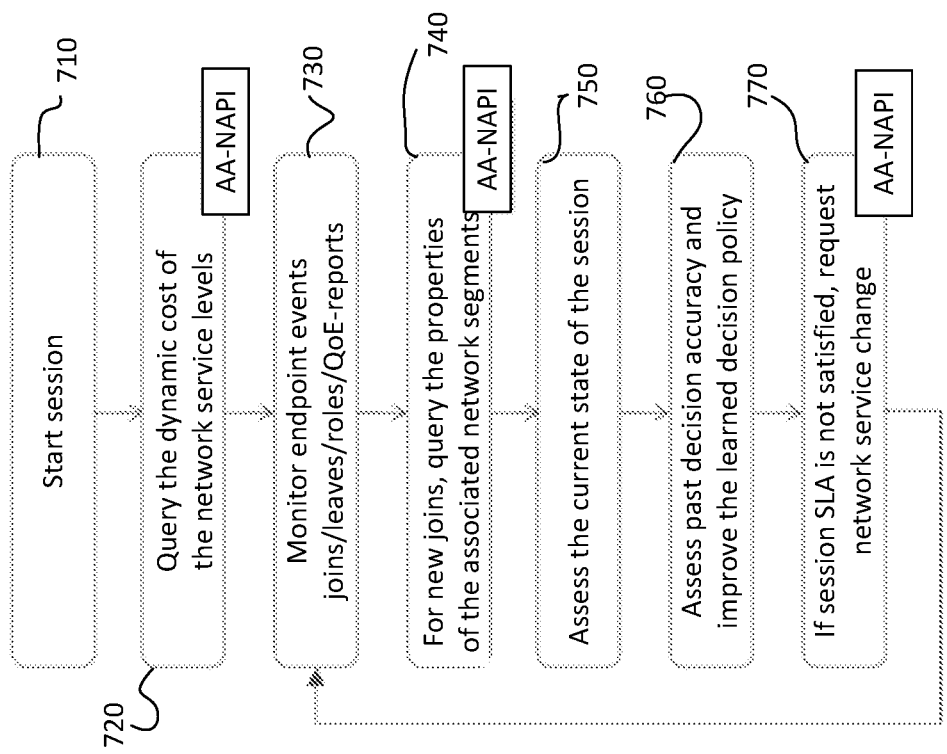
FIG. 7 is a flowchart illustrating the method according to an embodiment implemented by the IAC around the capabilities of the AA-NAPI.

FIG. 7 illustrates a flowchart of the IAC centered around the capabilities of the AA-NAPI, according to an embodiment. The method illustrated by the flowchart comprises the following:
  710 upon receiving an endpoint request, the IAC starts an application session;
  720 the IAC uses the AA-NAPI to learn the current cost model of the network service levels;
  730 the IAC monitors endpoint join events, endpoint exit events, the roles of the endpoints (talking, sharing, streaming, . . . ), and the QoE reports from the endpoints;
  740 for every endpoint that joins the session, the IAC queries the CSP to learn the properties of the endpoint's AN network (e.g., to verify whether an application-quality service is available or not, or if the network can be controlled by the CSP) and the properties of the TNs between edge functions;
  750 based on the QoE reports from the endpoints (and any other input from the environment that helps assess the service quality of the session), the IAC determines the current state of the session;
  760 based on the current state of the session, the IAC assesses the adequacy of its previous decisions and updates its learned decision-making policy if it is determined that it should be improved;
  770 if the current state of the session indicates a service level agreement (SLA) violation, the IAC takes action to make changes to the network services or activates new edge functions.

The IAC continues monitoring the session as described above. As said, the flowchart of FIG. 7 illustrates one possible embodiment for the present solution.

Figure 8:
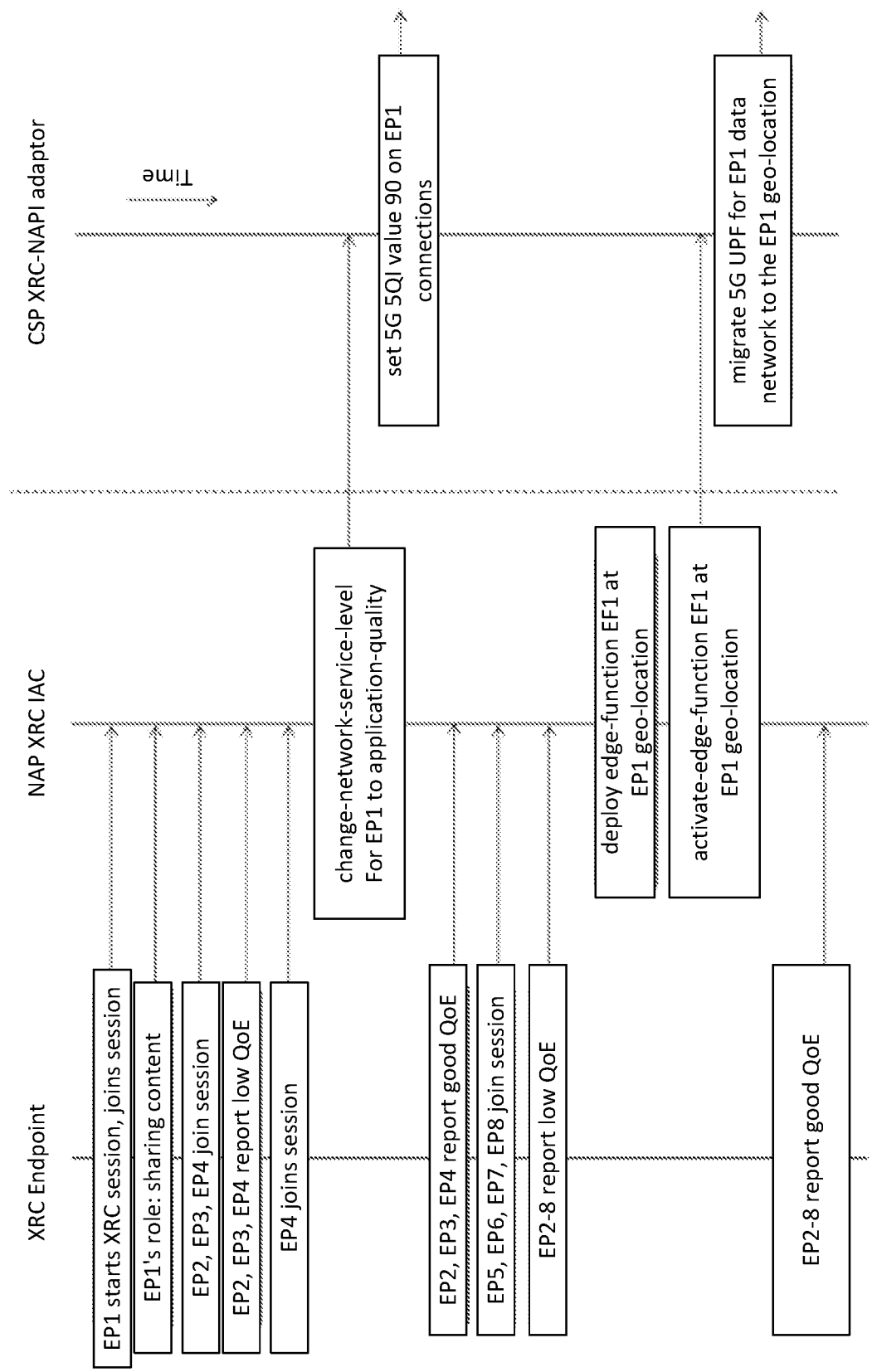
FIG. 8 illustrates an XRC application workflow according to an embodiment.

FIG. 8 illustrates an example of an XRC application workflow (query requests by NAP are not shown in the chart). FIG. 8 shows the transactions between the XRC endpoints, the XRC IAC, and the XRC-NAPI adaptor. The chart shown in FIG. 8 indicates time steps from top to bottom.

As shown in FIG. 8
  Endpoint 1 (EP1) starts a session by contacting the IAC and implicitly joins the session;
  EP1 indicates that it is sending content to other nodes in the session;
  EP2 joins the session; reports good QoE to the IAC;
  EP3 joins the session; reports good QoE;
  EP4 joins the session; all three endpoints report low QoE.
  The IAC decides to set the service type of the AN of EP1 to application-quality;
  The XRC-NAPI adaptor sends commands to the lower-level service APIs to set the 5G mobile network slice that serves EP1 to support high bandwidth (3GPP 5G 501 value 90 on the bearer connections).
  Endpoints 2, 3, and 4 report good QoE;
  EP5 joins the session; reports good QoE;
  EP6 joins the session; reports good QoE;
  EP7 joins the session; reports good QoE;
  EP8 joins the session; all the endpoints now report bad QoE;
  The IAC decides to deploy an edge function to process and forward media flows from EP1;
  The IAC sends the activate-edge-function command to the XRC-NAPI adaptor;
  The XRC-NAPI adaptor sends commands to the lower-level APIs to migrate the 5G UPF functions that terminates the EP1 data network connections close to the geo-location of EP1;
  All endpoints report good QoE.

It should be noted that the XRC-NAPI adaptor may send intents to the E2E service orchestration API or may send commands directly to the individual network domain managers (e.g., to the domain manager of the 3GPP 5G access network).

It should be also noted that for a specific network instance, in order to prevent any QoE degradation, the IAC can learn to activate edge functions when a certain number of endpoints join the session (instead of acting only on bad QoE reports). Similarly, it can also learn to upgrade the service type of the transmitting endpoint AN when a certain number of endpoints join the session.

Notes:

The present embodiments relate to the conceptual model of NAP-CSP interaction via the AA-NAPI. Therefore, embodiments of the AA-NAPI for all application types (besides the XRC-NAPI) are also covered.

It should be noticed that there may be different cost models for premium service quality. For example, the endpoint, and not the NAP, may be paying for the additional, dynamic cost of the premium service type. Additional cost models may be envisioned, depending on the combinations of business arrangements that can be defined within the endpoint-NAP-CSP trio.

Besides the NAP and the CSP, the AA-NAPI conceptual model may also include other functional entities.

Besides the XRC-NAPI, the AA-NAPI can be described for application types related to many scenarios such as the ones listed in the document ETSI TR 126 928 V16.1.0. They include online XR gaming, real-time XR sharing and XR mission critical.

It should be noticed that the XRC-NAPI definition is using a practical representation that is easy to follow. Instead, the AA-NAPI can be described as an abstract object to cover all possible application types using a metalanguage with a formal grammar. However, that type of notation would be highly complicated, difficult to dissect and to understand.

The XRC-NAPI definition in this disclosure only shows the semantically relevant attributes and options. Other common options relating to these types of APIs are not shown. For example, in an operational API, each request may have a request ID; each request may have an acknowledging response; request transactions may be executed in a reliable mode with two-phase commits; requests may include attributes that fully describe the context such as the originating organization, intended recipient destination; requests may be conducted by use of an encapsulating messaging protocol that may present its own attributes and operational methods; requests may have security attributes and settings to support secure operations, and many others that are not listed here.

In the XRC application example, the IAC only upgrades the network service type during a session. Another embodiment may both upgrade and downgrade the service type during a session.

It is assumed that the interactions between the NAP and CSP are based on trust. Scenarios related to potential malicious actions are not mentioned in the present disclosure.

Some of the semantic aspects that are brought together in a single interface for a networked application to simplify its operation include:

- an application-specific model for different interface definitions—simplifying the information model by containing only the necessary and specific set of entities;
- the capability for the application to control service components via application object references, such as endpoints—for example, a request to improve the service quality level of an endpoint's access network; which the network controller may translate into network-specific actions known by the specific applications;
- depending on the characteristics of the application (XR-applications in this disclosure), having semantic entities in the interface for the application to change service function chains and their connectivity. For example, the application may only indicate the need for a network function associated with a cluster of endpoints; knowing the context of the application-type, the network controller can take network-specific actions and reconfigure connectivity.

The IAC does not have to start a session with application-quality connections (high-quality service) all throughout. This clearly differs from existing network-slice orchestrations solutions, where the service type is set independently of application activity. The IAC waits for the QoE reports from the endpoints and activates the application-quality service type only if and where the QoE is below the acceptance threshold. The IAC can also learn to upgrade the service type of individual networks as more and more endpoints join the session. This conditional action reduces the operational cost of the application (through more efficient use of resources) and allows it to support scenarios where the participants of a session have different service quality expectations, as is the case with endpoints consisting of small devices or endpoints that prefer to stick with a low-cost service and declare that they are not willing to upgrade to a premium service in their access networks. It should be noted that the IAC also has the option to start a session with application-quality service type on all networks, for example when the application is of a mission-critical type. To achieve this goal, the network control interfaces that exists within the network domain today cannot simply be exposed to the application domain as is. The network domain's complex interfaces are designed for maximum functional abstraction and commonality. A type of interface that is suitable for use by the application has to be application-specific with limited functional scope, and simple to understand and use with semantic coverage from the application developer's perspective, not in the semantic language of the network domain.

As opposed to the conventional end-to-end service management model, the network model of the AA-NAPI allows the IAC to control service levels of multiple sub-networks between service points. For example, for a session between a transmitting endpoint and four listening endpoints, upgrading the service type of the transmitting endpoint AN may improve the QoE for all parties. Thus, the application does not have to pay for higher service quality for the connections of the listening nodes. When most of the endpoints report low QoE, rather than upgrade the service type of all the endpoints, the IAC can first activate an edge-function at the transmitting endpoint's edge cloud to aggregate and forward the transmission flows, thus saving on the operational cost if the QoE becomes satisfactory for that given network with all the relevant constraints of the current environment.

Defining the service type simply as "application-quality" allows the application developer to just select the application type but not necessarily learn about the technical details of the level of the network KPIs that must be satisfied to meet the SLA requirements. Through this type of convenience, the invention allows CSPs to strongly position themselves within the ecosystem of the next generation of networked applications—not giving away business to other layers of providers.

The application-specific constraints of the present embodiments reduce the surface of security attacks, making it more appealing for CSPs to offer northbound programming interfaces for their end-to-end services.

The present embodiments allow NAPs to interact directly with the CSPs, without the overhead and cost of having other providers in between.

The present embodiments provide opportunities for NAPs and CSPs to optimize their operational costs in real-time—driven by countless conditions that are constantly changing in the environment.

The purpose and benefit of the AA-NAPI are to present the existing capabilities of a network's E2E service orchestration infrastructure in a refined, simplified, and application-friendly way to third-party application developers. The AA-NAPI is not meant to extend the real-time control capabilities of the underlying network infrastructure. If those capabilities are limited, they remain limited. For example, a vendor may provide a dynamic E2E slice control service with 1-second response time; this capability may be offered as part of a suite of vendor APIs, some of which may be related to authentication, security, policy, or charging. Instead of presenting the XR developers with the overwhelming complexity of the full API suite, with the XRC-NAPI the vendor offers them a simplified interface for accessing all the orchestration features that are relevant to their XR applications, as part of the NaaS offer. The southbound end of the XRC-NAPI (the vendor-specific XRC-NAPI adaptor) uses the complete set of APIs that are part of the vendor's E2E orchestration suite, but without trying to improve the slice control resolution of the underlying infrastructure.

The embodiments do not depend on specific types of E2E service orchestration APIs (standard or vendor-based). Any details on the southbound interface (the AA-NAPI adaptor) would only be meaningful for the service orchestration suite of the chosen example. One such example is shown in FIG. 5 of the disclosure. In that embodiment, a Python-based REST API maps requests to internal commands of a micro-services-based network fabric infrastructure. For example, the API command <Activate Edge Function> is mapped to a series of actions involving multiple APIs of the network fabric—e.g., identifying the current talking node, identifying its edge-cloud cluster, identifying the serving node at the cluster, determining if the required network function can be deployed at the node, deploying the network function, and finally reconfiguring the service chain to place the edge-cloud node in the loop for the talking node.

Figure 9:
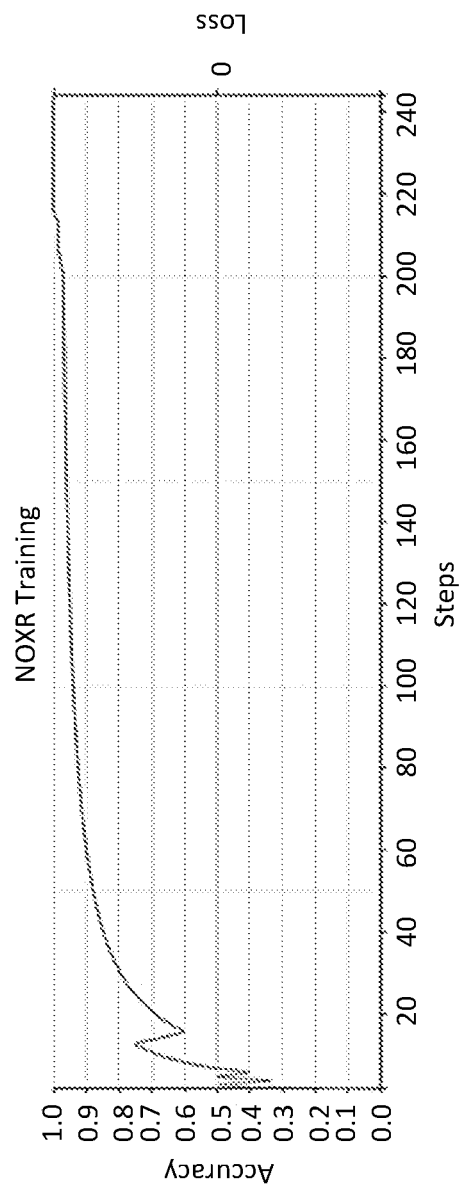
FIG. 9 illustrates how the IAC learns to request service type changes in sub-networks.

FIG. 9 illustrates how the IAC in the proof-of-concept implementation learns to request service type changes for sub-networks that are relevant to the operation of the XRC application—improving its decision policy. The chart indicates that the agent learns to make correct decisions with at least 0.5% accuracy in about 240 episodic trials.

Figure 10:
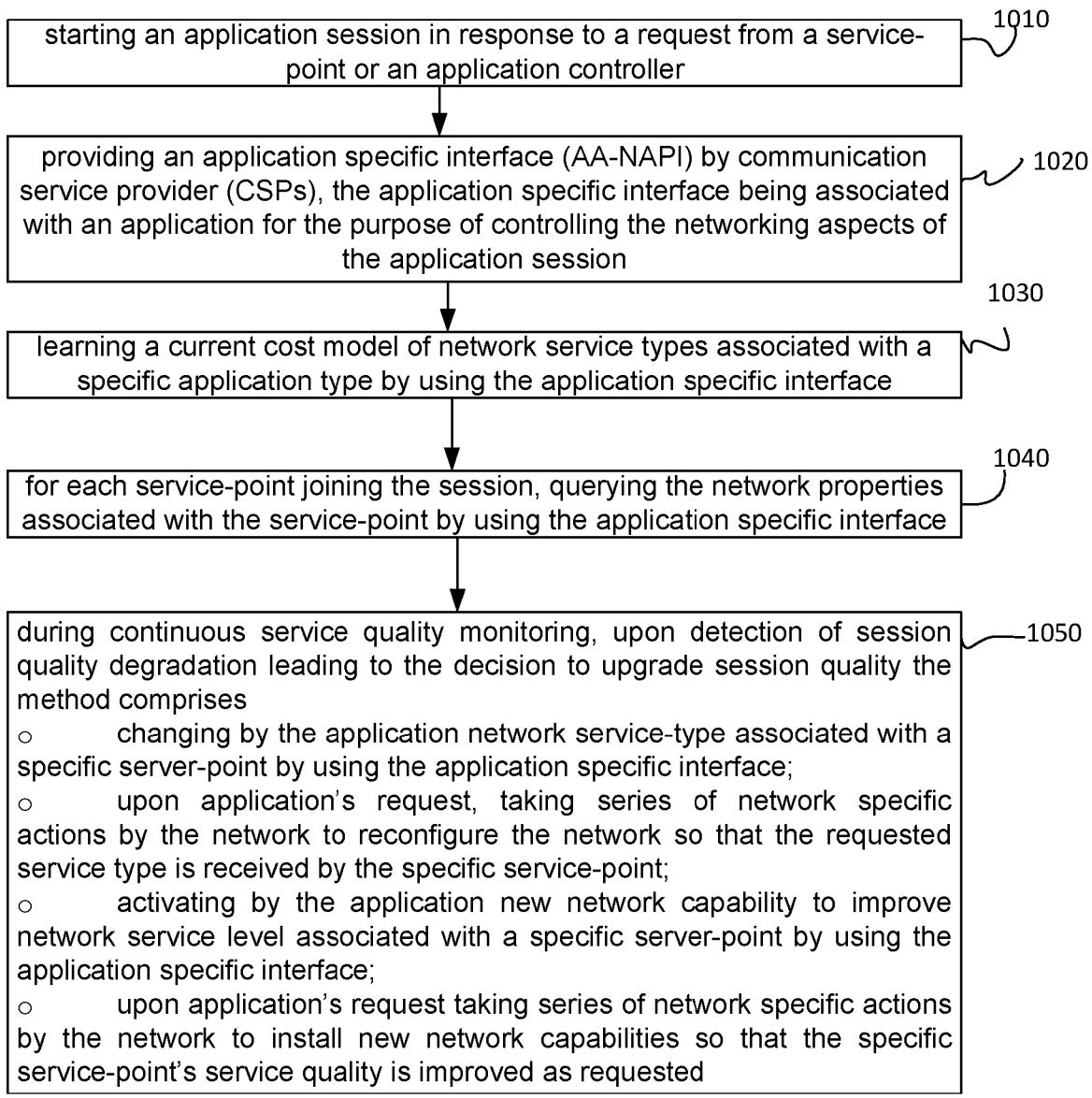
FIG. 10 is a flowchart illustrating a method according to an embodiment.

The method according to an embodiment is shown in FIG. 10. The method generally comprises
- starting 1010 an application session in response to a request from a service-point or an application controller;
- providing 1020 an application specific interface (AA-NAPI) by communication service provider (CSPs), the application specific interface being associated with an application for the purpose of controlling the networking aspects of the application session;
- learning 1030 a current cost model of network service types associated with a specific application type by using the application specific interface;
- for each service-point joining the session, the method comprises querying 1040 the network properties associated with the service-point by using the application specific interface;
- during continuous service quality monitoring 1050, upon detection of session quality degradation leading to the decision to upgrade session quality the method comprises
  - changing by the application network service-type associated with a specific server-point by using the application specific interface;
  - upon application's request, taking series of network specific actions by the network to reconfigure the network so that the requested service type is received by the specific service-point;
  - activating by the application new network capability to improve network service level associated with a specific server-point by using the application specific interface;
  - upon application's request taking series of network specific actions by the network to install new network capabilities so that the specific service-point's service quality is improved as requested.

Each of the steps can be implemented by a respective module of a computer system.

An apparatus according to an embodiment comprises means for starting an application session in response to a request from a service-point or an application controller; means for providing an application specific interface (AA-NAPI) by communication service provider (CSPs), the application specific interface being associated with an application for the purpose of controlling the networking aspects of the application session; means for learning a current cost model of network service types associated with a specific application type by using the application specific interface; for each service-point joining the session, the apparatus comprises means for querying the network properties associated with the service-point by using the application specific interface; during continuous service quality monitoring, upon detection of session quality degradation leading to the decision to upgrade session quality the apparatus comprises

- means for changing network service-type associated with a specific server-point by the application by using the application specific interface;
- upon application's request, means for taking series of network specific actions by the network to reconfigure the network so that the requested service type is received by the specific service-point;
- means for activating new network capability by the application to improve network service level associated with a specific server-point by using the application specific interface;
- upon application's request, means for taking series of network specific actions by the network to install new network capabilities so that the specific service-point's service quality is improved as requested.

The means comprises at least one processor, and a memory including a computer program code, wherein the processor may further comprise processor circuitry. The memory and the computer program code are configured to, with the at least one processor, cause the apparatus to perform the method of FIG. 10 according to various embodiments.

Figure 11:
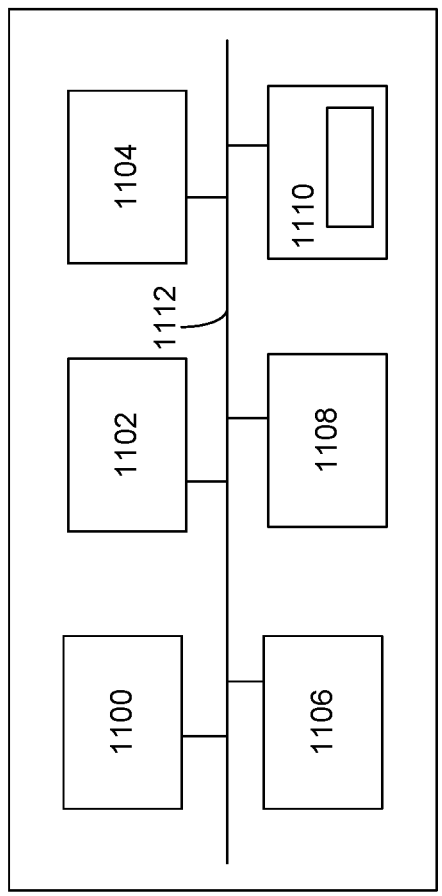
FIG. 11 shows an apparatus according to an embodiment.

FIG. 11 illustrates an apparatus according to an embodiment. The generalized structure of the apparatus will be explained in accordance with the functional blocks of the system. Several functionalities can be carried out with a single physical device, e.g. all calculation procedures can be performed in a single processor if desired. A data processing system of an apparatus according to an example of FIG. 11 comprises a main processing unit 1100, a memory 1102, a storage device 1104, an input device 1106, an output device 1108, and a graphics subsystem 1110, which are all connected to each other via a data bus 1112. A client may be understood as a client device or a software client running on an apparatus.

The main processing unit 1100 is a processing unit arranged to process data within the data processing system. The main processing unit 1100 may comprise or be implemented as one or more processors or processor circuitry. The memory 1102, the storage device 1104, the input device 1106, and the output device 1108 may include other components as recognized by those skilled in the art. The memory 1102 and storage device 1104 store data in the data processing system 1100. Computer program code resides in the memory 1102 for implementing, for example, machine learning process. The input device 1106 inputs data into the system while the output device 1108 receives data from the data processing system and forwards the data, for example to a display. While data bus 1112 is shown as a single line it may be any combination of the following: a processor bus, a PCI bus, a graphical bus, an ISA bus. Accordingly, a skilled person readily recognizes that the apparatus may be any data processing device, such as a computer device, a personal computer, a server computer, a mobile phone, a smart phone or an Internet access device, for example Internet tablet computer.

The various embodiments may provide advantages. For example, the present embodiments provide capabilities that will enable the CSPs to strongly position themselves within the ecosystem of next-generation networked applications.

The application-specific constraints of the present solution help to reduce the security attack surface, making it less concerning for CSPs to offer programming interfaces to other parties for control of their end-to-end services.

The present embodiments allow the NAPs to effortlessly establish a direct interaction with the CSPs without the overhead and the cost of having other providers in between.

The present embodiments also provide opportunities for the NAPs to optimize their operational costs and for the CSPs to better utilize resources in real-time—driven by a large variety of conditions that are continuously evolving in the environment.

The various embodiments can be implemented with the help of computer program code that resides in a memory and causes the relevant apparatuses to carry out the method. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of various embodiments.

If desired, the different functions discussed herein may be performed in a different order and/or concurrently with other. Furthermore, if desired, one or more of the above-described functions and embodiments may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications, which may be made without departing from the scope of the present disclosure as, defined in the appended claims.

The invention claimed is:

1. An apparatus for communication, comprising at least one processor, memory including computer program code, the memory and the computer program code configured to, with the at least one processor, cause the apparatus to perform at least the following:
   start an application session associated with an application having an application type in response to a request from at least one of a service-point or an application controller, wherein the application session executes using network resources of a network;
   provide an application specific interface (AA-NAPI) configured to communicate with one or more interfaces associated with the at least one of the service-point or the application controller and with at least one communication service provider (CSP) interface;
   determine, by using the AA-NAPI to transmit a cost inquiry to the communication service provider via the at least one CSP interface, a current cost model associated with network service types associated with the application type;
   for each service-point joining the application session, using the AA-NAPI to transmit a query to the one or more interfaces associated with respective service-points, wherein the query requests network properties associated with the service-point;
   monitor service quality during the application session; and
   in response to detection of application session quality degradation, take at least one of the following remedial actions:
      transmit, from the AA-NAPI to the at least one CSP interface, a request from the application to change a network service-type associated with a specific service-point;
      in response to a request from the application, transmit, from the AA-NAPI to the at least one CSP interface, a request to reconfigure the network;
      transmit, from the AA-NAPI to the at least one CSP interface, a request by the application to activate a new network capability; or
      transmit, from the AA-NAPI to the at least one CSP interface, a request by the application to install a new network capability.

2. The apparatus according to claim 1, wherein the memory and the computer program code, with the at least one processor, further cause the apparatus to transmit, from the AA-NAPI to the at least one CSP interface, a request by the application to, in response to detection of potentially unnecessary network service capabilities, take at least one of the following remedial actions:
   transmit, from the AA-NAPI to the at least one CSP interface, a request from the application to change a network service-type associated with a specific service-point;
   in response to a request from the application, transmit, from the AA-*NAPI* to the at least one CSP interface, a request to reconfigure the network;
   transmit, from the AA-NAPI to the at least one CSP interface, a request by the application to deactivate a network capability; or
   transmit, from the AA-NAPI to the at least one CSP interface, a request by the application to uninstall a network capability.

3. The apparatus according to claim 1, wherein the memory and the computer program code, with the at least one processor, further cause the apparatus to transmit, from the AA-NAPI to the at least one CSP interface, a request by the application to add an edge function associated with the specific service-point.

4. The apparatus according to claim 1, wherein the memory and the computer program code, with the at least one processor, further cause the apparatus to transmit, from the AA-NAPI to the at least one CSP interface, a request by the application to insert a network function to an edge cloud associated with the specific service-point.

5. The apparatus according to claim 2, wherein the memory and the computer program code, with the at least one processor, further cause the apparatus to transmit, from the AA-NAPI to the at least one CSP interface, a request by the application to remove an edge function.

6. The apparatus according to claim 2, wherein the memory and the computer program code, with the at least one processor, further cause the apparatus to transmit, from the AA-NAPI to the at least one CSP interface, a request by the application to remove a network function at an edge cloud associated with the specific service-point.

7. The apparatus according to claim 1, wherein the application is an eXtended Reality Conversation (XRC) application.

8. A method for communication, comprising:
   starting an application session associated with an application having an application type in response to a request from at least one of a service-point or an application controller, wherein the application session executes using network resources of a network;
   providing an application specific interface (AA-NAPI) configured to communicate with one or more interfaces associated with the at least one of the service-point or the application controller and with at least one communication service provider (CSP) interface;

determining, by using the AA-NAPI to transmit a cost inquiry to the communication service provider via the at least one CSP interface, a current cost model of network service types associated with the application type;

for each service-point joining the application session, using the AA-NAPI to transmit a query to the one or more interfaces associated with respective service-points, wherein the query requests network properties associated with the service-point;

monitoring service quality during the application session; and in response to detection of application session quality degradation, take at least one of the following remedial actions transmitting, from the AA-NAPI to the at least one CSP interface, a request from the application to change a network service-type associated with a specific service-point;

in response to a request from the application, transmitting, from the AA-NAPI to the at least one CSP interface, a request to reconfigure the network;

in response to a request from the application, transmitting, from the AA-NAPI to the at least one CSP interface, a request to activate a new network capability; or in response to a request from the application, transmitting, from the AA-NAPI to the at least one CSP interface, a request to install a new network capability.

9. The method according to claim 8, further comprising:

transmitting, from the AA-NAPI to the at least one CSP interface, a request by the application, to take at least one of the following remedial actions in response to detection of potentially unnecessary network service capabilities transmitting, from the AA-NAPI to the at least one CSP interface, a request from the application to change a network service-type associated with the specific service-point;

in response to a request from the application, transmitting, from the AA-NAPI to the at least one CSP interface, a request to;

transmitting, from the AA-NAPI to the at least one CSP interface, a request from the application to deactivate a network capability;

in response to a request from the application, transmitting, from the AA-NAPI to the at least one CSP interface, a request to uninstall network capabilities.

10. The method according to claim 8, further comprising transmitting, from the AA-NAPI to the at least one CSP interface, a request to add an edge function associated with the specific service-point.

11. The method according to claim 8, further comprising transmitting, from the AA-NAPI to the at least one CSP interface, a request to insert a network function to an edge cloud associated with the specific service-point as a network capability.

12. The method according to claim 8, further comprising transmitting, from the AA-NAPI to the at least one CSP interface, a request to remove an edge function.

13. The method according to claim 8, further comprising transmitting, from the AA-NAPI to the at least one CSP interface, a request to remove a network function at an edge cloud associated with the specific service-point.

14. The method according to claim 8, wherein the application is an eXtended Reality Conversation (XRC) application.

15. A non-transitory computer readable medium, including computer program instructions stored thereon, which, when executed with the at least one processor, cause the apparatus to:

start an application session associated with an application having an application type in response to a request from at least one of a service-point or an application controller, wherein the application session executes using network resources of a network;

provide an application specific interface (AA-NAPI) configured to communicate with one or more interfaces associated with the at least one of the service-point or the application controller and with at least one communication service provider (CSP) interface;

determine, by using the AA-NAPI to transmit a cost inquiry to the communication service provider via the at least one CSP interface, a current cost model associated with network service types associated with the application type;

for each service-point joining the application session, using the AA-NAPI to transmit a query to the one or more interfaces associated with respective service-points, wherein the query requests network properties associated with the service-point;

monitor service quality during the application session; and in response to detection of application session quality degradation, take at least one of the following remedial actions:

transmit, from the AA-NAPI to the at least one CSP interface, a request from the application to change a network service-type associated with a specific service-point;

in response to a request from the application, transmit, from the AA-NAPI to the at least one CSP interface, a request to reconfigure the network;

transmit, from the AA-NAPI to the at least one CSP interface, a request by the application to activate a new network capability; or transmit, from the AA-NAPI to the at least one CSP interface, a request by the application to install a new network capability.

* * * * *

UNITED STATES PATENT AND TRADEMARK OFFICE
CERTIFICATE OF CORRECTION

PATENT NO. : 11,996,989 B2
APPLICATION NO. : 18/318221
DATED : May 28, 2024
INVENTOR(S) : Bilgehan Erman et al.

It is certified that error appears in the above-identified patent and that said Letters Patent is hereby corrected as shown below:

On the Title Page

Page 3, Replace the text on, Lines 15-16 item (56) References Cited (OTHER PUBLICATIONS), with the following text:
"Finnish Notice of Allowance dated March 21, 2024 issued in Finnish Appl. No. 20225487."

In the Claims

Column 23, Line 33, cancel the text beginning with "9. The method according to claim 8" and ending "request to uninstall network capabilities." in Column 23, Line 50, and insert the following claim:
--9. The method according to claim 8, further comprising: transmitting, from the AA-NAPI to the at least one CSP interface, a request by the application, to take at least one of the following remedial actions in response to detection of potentially unnecessary network service capabilities transmitting, from the AA-NAPI to the at least one CSP interface, a request from the application to change a network service-type associated with the specific service-point; in response to a request from the application, transmitting, from the AA-NAPI to the at least one CSP interface, a request to reconfigure the network; transmitting, from the AA-NAPI to the at least one CSP interface, a request from the application to deactivate a network capability; in response to a request from the application, transmitting, from the AA-NAPI to the at least one CSP interface, a request to uninstall network capabilities.--

Signed and Sealed this
Thirtieth Day of July, 2024

Katherine Kelly Vidal
*Director of the United States Patent and Trademark Office*